United States Patent [19]

Okumura

[11] Patent Number: 5,209,116
[45] Date of Patent: May 11, 1993

[54] UNBALANCE POINT POSITIONING APPARATUS AND METHOD

[75] Inventor: Hiromitu Okumura, Osaka, Japan

[73] Assignee: Denshi Seiki Kogyo Kabushiki Kaisha, Osaka, Japan

[21] Appl. No.: 889,291

[22] Filed: Nov. 6, 1991

Related U.S. Application Data

[63] Continuation of Ser. No. 584,402, Sep. 17, 1990, abandoned, which is a continuation of Ser. No. 322,267, Mar. 10, 1989, abandoned.

[51] Int. Cl.$^5$ .............................................. G01M 1/22
[52] U.S. Cl. ..................................................... 73/462
[58] Field of Search ........................... 73/462, 464, 468

[56] References Cited

U.S. PATENT DOCUMENTS

| | | | |
|---|---|---|---|
| 3,017,773 | 1/1962 | Lash et al. | 73/462 |
| 4,419,894 | 12/1983 | Matumoto | 73/462 |
| 4,741,210 | 5/1988 | Maus | 73/462 |
| 4,868,762 | 9/1989 | Grim et al. | 73/462 |
| 4,980,621 | 12/1990 | Muller | 73/462 |

FOREIGN PATENT DOCUMENTS 61-97545  5/1986  Japan ..................... 73/462

Primary Examiner—John E. Chapman
Attorney, Agent, or Firm—Edwin E. Greigg; Ronald E. Greigg

[57] ABSTRACT

The present invention relates to an unbalance point positioning method and an apparatus therefor, which carry out a positioning operation with high precision and within a short time by using, as a trigger, an unbalance phase signal due to revolution of an unbalance point of a measured object, and effecting deceleration control through feedback control with a voltage corresponding to a rotational frequency of the measured object.

The apparatus includes means for rotating the object at a high speed and for determining the amount as well as the angular position of the unbalance of the object. Once the angular position is determined, this information is used to trigger a predetermined deceleration signal, which smoothly and continuously decelerates the measured object until the object is stopped with the unbalance point at a preselected position. A gradual deceleration curve, generated using a resistor and capacitor circuit, is used to minimize slippage between the rotating object and the drive mechanism. In order to further reduce the slippage between the rotating object and the drive mechanism while smoothly stopping the object, a feedback signal based on the actual rotation speed of the object is subtracted from the predetermined deceleration signal so that a negligible amount of slippage is achieved.

13 Claims, 7 Drawing Sheets

UNBALANCE POINT POSITIONING APPARATUS AND METHOD

This is a continuation of copending application Ser. No. 07/584,402 filed Sep. 17, 1990, abandoned, which is a continuation of Ser. No. 07/322,267 filed Mar. 10, 1989, abandoned.

BACKGROUND OF THE INVENTION (1) Field of the Invention

The present invention relates to an unbalance point positioning method and an apparatus therefor which are used for measuring positions and amounts of unbalanced and correcting and shaping unbalance points of rotatable objects such as a rotor of an electric motor, a fan, a rotary shaft and the like which require a good rotational balance.

(2) Description of the Prior Art

In conventional no-mark, no-sensor type positioning methods and apparatus, a measured object is stopped by utilizing an unbalance phase signal as a trigger for inputting a pulse signal to a preset counter, and selecting a preset value for stopping an unbalance point at an appropriate position. The above pulse signal may comprise a stepping motor drive pulse signal or a pulse signal output from a rotary encoder or the like representing every unit angle of rotation. In this case, the measured object is maintained in constant low-rate rotation for a time after start of deceleration from high-rate rotation for measurement and before stoppage, to wait for the preset counter to finish counting. The measured object is stopped as soon as the count of the pulse signal for every unit angle of rotation reaches the preset value.

One example of unbalance signal detecting device used in conventional unbalance measuring apparatus is shown in FIG. 8.

In FIG. 8, a pressure sensor 115 detects vibrations resulting from revolution of an unbalance point of a measured object such as a rotor 116 and transmitted through a bearing 117 and a horizontal member 118.

The vibrations detected by the pressure sensor 115 include not only the vibrations due to the revolution of the unbalance point but horizontal vibration components due to vibrations of the ground and other sources.

The frequency of vibrations due to the revolution of the unbalance point equals the rotational frequency of the rotor 116. The resulting signal may therefore be passed through a bandpass filter which allows passage of a frequency synchronized with the rotational frequency, to secure an unbalance signal stripped of the horizontal vibration components due to vibrations of the ground or the like.

The known detecting device includes an amplifier for compensating for attenuation of the signal occurring with the passage through the bandpass filter.

Further, a measured object support mechanism used in the known unbalance measuring apparatus, as shown in FIG. 8, has the bearing 117 rotatably supporting a shaft of the measured object 116. The bearing 117 is secured to the oscillatable horizontal member 118.

The oscillatable member 118 is supported at opposite ends thereof by plate springs A to be oscillatable right and left. The vibration sensor 115 is supported as sandwiched between one of the plate springs A and a base block B.

The plate springs A are urged toward the vibration sensor 115 to hold the vibration sensor 115 against downward slipping.

In the known positioning method, however, slips occur between a drive belt and the measured object when the measured object in constant low-rate rotation is instantly stopped when the counter finishes counting. Such slips are the main cause of positioning errors.

Moreover, it is necessary to maintain the low-rate rotation for a certain length of time to wait for the completion of counting. This prevents shortening of the time taken for a positioning operation.

In order to minimize the slips occurring between the measured object and drive belt at positioning times, two troublesome operations are required, i.e. adjustment of drive motor slow-down time and adjustment of the preset value of the preset counter for stopping the unbalance point at a selected position. These two adjustment operations interfere with each other, and are therefore difficult to carry out smoothly.

Further, the known method has a further disadvantage of processing complexity in that it requires speed setting and control signals for the high-rate rotation at times of unbalance measurement and for the constant low-rate rotation at times of unbalance point positioning.

There is a problem of high cost since the positioning apparatus must include, as essential components thereof, a preset counter and a device for generating a pulse signal every unit angle of rotation.

The known unbalance signal detecting device used in the unbalance measuring apparatus is capable of removing horizontal vibration components due to vibrations of the ground or the like by passing the signal through a bandpass filter. However, an amplifier is needed to compensate for the signal attenuation resulting from the passage through the bandpass filter. This results in a complicated and expensive detecting device. In addition, the detecting precision of the device cannot be improved since it is impossible to remove the external vibrations synchronized with the rotation of the measured object.

Furthermore, whenever the rotational frequency of the measured object is varied at times of unbalance measurement, the frequency passed through the bandpass filter must be varied or an expensive filter such as a tracking filter is required.

The known measured object support mechanism used in the unbalance measuring apparatus does not allow high precision measurement since slight vibration energy is absorbed by the plate springs supporting the oscillatable member.

There is the further problem that resonance of the plate springs and associated elements and distortion of the plate springs per se obstruct accurate unbalance measurement.

SUMMARY OF THE INVENTION

The object of the present invention, therefore, is to provide an unbalance point positioning method and an apparatus therefor which overcome the various disadvantages of the prior art noted above.

In order to achieve this object, an unbalance point positioning method according to the present invention comprises the steps of producing a drive control signal forming a basis for acceleration, constant-rate rotation and deceleration of a measured object, obtaining an unbalance phase signal resulting from revolution of an unbalance point of the measured object by causing a drive device controlled by the drive control signal to rotate the measured object at a high rate, producing a frequency-responsive voltage corresponding to a rotational frequency of the measured object, starting deceleration control through the drive control signal, by utilizing the unbalance phase signal as a trigger, while effecting feedback control of the rotational frequency of the measured object with the frequency-responsive voltage, and stopping the unbalance point of the measured object at a selected position after rotation of the measured object through a predetermined angle.

Alternatively, the unbalance point positioning method may comprise the steps of producing a drive control signal forming a basis for acceleration, constant-rate rotation and deceleration of a measured object, obtaining an unbalance phase signal resulting from revolution of an unbalance point of the measured object by causing a drive device controlled by the drive control signal to rotate the measured object at a high rate, effecting time control of the drive control signal transmitted to the drive device by utilizing the unbalance phase signal as a trigger, and stopping the unbalance point of the measured object at a selected position after lapse of a predetermined time.

In the above method, a selected function may be used as a basis for effecting the time control of the drive control signal transmitted to the drive device.

A discharge characteristic of a capacitor may be used instead as the basis for effecting the time control of the drive control signal transmitted to the drive device.

An unbalance point positioning apparatus for measuring a rotatable object according to the present invention comprises drive control signal generating means for producing a drive control signal forming a basis for acceleration, constant-rate rotation and deceleration of a measured object, drive means controllable by the drive control signal to rotate the measured object at a high rate, unbalance phase signal generating means for producing an unbalance phase signal resulting from revolution of an unbalance point of the measured object, frequency-responsive voltage generating means for producing a frequency-responsive voltage corresponding to a rotational frequency of the measured object, a feedback circuit for effecting feedback control of the rotational frequency of the measured object with the frequency-responsive voltage, and a gate circuit for starting deceleration control of the measured object with the drive control signal in timed relationship with the unbalance phase signal, whereby the measured object is stopped after rotation through a predetermined angle to stop the unbalance point of the measured object at a selected position.

Alternatively, the unbalance point positioning apparatus may comprise drive control signal generating means for producing a drive control signal forming a basis for acceleration, constant-rate rotation and deceleration of a measured object, drive means controllable by the drive control signal to rotate the measured object at a high rate, unbalance phase signal generating means for producing an unbalance phase signal resulting from revolution of an unbalance point of the measured object, and a gate circuit for starting deceleration control of the measured object with the drive control signal in timed relationship with the unbalance phase signal, whereby time control is effected on the drive control signal transmitted to the drive means after start of the deceleration control to stop the unbalance point of the measured object at a selected position.

In the above apparatus, the drive control signal generating means may include a function generating circuit.

Further, the drive control signal generating means may include a function generating circuit utilizing a digital logic element instead.

The drive control means may include a Miller integrator circuit having a capacitor and a resistor or a variable resistor.

The present invention also provides an unbalance signal detecting device for use with a measured object support mechanism in an unbalance measuring apparatus for causing sensor means to detect vibrations resulting from rotation of a measured object supported by a measured object supporting member and measuring an unbalance of the object. This unbalance signal detecting apparatus comprises first vibration detecting means for detecting composite vibrations of unbalance vibrations resulting from revolution of an unbalance point of the measured object and external vibrations transmitted from outside, second vibration detecting means for detecting the external vibrations only, and computing means for processing signals provided by the first detecting means and the second detecting means to cancel signal components due to the external vibrations thereby to obtain an unbalance signal reflecting the unbalance vibrations only.

According to one of the unbalance point positioning methods provided by the present invention, a drive control signal forming a basis for acceleration, constant-rate rotation and deceleration of a measured object is produced. Then an unbalance phase signal resulting from revolution of an unbalance point of the measured object is obtained by causing a drive device controlled by the drive control signal to rotate the measured object at a high rate. Further, a frequency-responsive voltage corresponding to a rotational frequency of the measured object is produced.

When positioning the unbalance point, deceleration control through the drive control signal is started by utilizing the unbalance phase signal as a trigger. The deceleration control is started while effecting feedback control of the rotational frequency of the measured object with the frequency-responsive voltage. Consequently, the unbalance point of the measured object is stopped at a selected position after rotation of the measured object through a predetermined angle.

The feedback control prevents a positioning error from being caused by any slips occurring between the drive device and the measured object. This feature enables the unbalance point to be stopped at a selected position after rotation of the measured object through a predetermined angle.

Where, for example, an accumulative rotational frequency of the measured object from the start of deceleration exceeds a predetermined value because of slips, the frequency-responsive voltage is raised to lower the drive control signal by the feedback control. This feature assures correct deceleration control.

The drive control signal variation lowers the rotational frequency of the measured object with a gradient variable by adjusting the amount of frequency-responsive voltage generated for each rotation of the measured object. Consequently, by adjusting this gradient, it is possible to adjust the time taken from the start of deceleration to stoppage, namely the stopping position of the unbalance point of the measured object. In this way the unbalance point may be stopped at a selected position.

The frequency-responsive voltage is generated by detecting peripheral characteristics of the measured object with a magnetic, optical or other sensor, or by utilizing a signal synchronized with the rotation of the measured object (which may be an output signal of a voltage-frequency converter providing stepping motor drive pulses or the drive control signal mentioned above, for example, and which signal need not correspond to unit angle of rotation).

In the alternative positioning method according to the present invention, a drive control signal forming a basis for acceleration, constant-rate rotation and deceleration of a measured object is produced, an unbalance phase signal resulting from revolution of an unbalance point of the measured object is obtained by causing a drive device controlled by the drive control signal to rotate the measured object at a high rate, time control of the drive control signal transmitted to the drive device is effected by utilizing the unbalance phase signal as a trigger, and the measured object is stopped at a selected position after lapse of a predetermined time. The stopping position of the unbalance point of the measured object is adjustable by adjusting the time from the start of deceleration to stoppage. Thus the unbalance point may be stopped at a selected position.

In the above method, a selected function may be used as a basis for effecting the time control of the drive control signal transmitted to the drive device.

A discharge characteristic of a capacitor may be used instead as the basis for effecting the time control of the drive control signal transmitted to the drive device.

The unbalance point positioning apparatus according to the present invention comprises drive control signal generating means for producing a drive control signal forming a basis for acceleration, constant-rate rotation and deceleration of a measured object, drive means controllable by the drive control signal to rotate the measured object at a high rate, unbalance phase signal generating means for producing an unbalance phase signal resulting from revolution of an unbalance point of the measured object, frequency-responsive voltage generating means for producing a frequency-responsive voltage corresponding to a rotational frequency of the measured object, and a feedback circuit for effecting feedback control of the rotational frequency of the measured object with the frequency-responsive voltage. When positioning the unbalance point, a gate circuit starts deceleration control of the measured object with the drive control signal in timed relationship with the unbalance phase signal, to decelerate the measured object through feedback control by the frequency-responsive voltage. Thus the measured object is stopped after rotation through a predetermined angle to stop the unbalance point of the measured object at a selected position.

The feedback control prevents positioning errors from being caused by any slips occurring between the drive device and the measured object. This feature enables the unbalance point to be stopped at a selected position after rotation of the measured object through a predetermined angle.

The other unbalance point positioning apparatus according to the present invention comprises means for producing a drive control signal forming a basis for acceleration, constant-rate rotation and deceleration of a measured object, drive means controllable by the drive control signal to rotate the measured object at a high rate, unbalance phase signal generating means for producing an unbalance phase signal resulting from revolution of an unbalance point of the measured object, and a gate circuit for starting deceleration control of the measured object with the drive control signal in timed relationship with the unbalance phase signal. Time control is effected on the drive control signal transmitted to the drive means after start of the deceleration control. The unbalance point stopping position is adjustable by adjusting the time from the start of deceleration to stoppage. Thus the unbalance point of the measured object may be stopped at a selected position.

In the above apparatus, the drive control signal generating means may include a function generating circuit. Then a deceleration curve may be designated with a desired function by a microcomputer or the like, to carry out a positioning operation within a minimum time without slips.

The drive control signal generating means may include a function generating circuit utilizing a digital logic element instead. Then the positioning operation may be carried out with optimal deceleration by appropriately controlling the deceleration curve.

Where the drive control means includes a Miller integrator circuit having a capacitor and a resistor or a variable resistor, a stable deceleration curve may be realized.

In the unbalance signal detecting device according to the present invention, the first vibration detecting means detects composite vibrations of unbalance vibrations resulting from revolution of an unbalance point of the measured object and external vibrations transmitted from outside, and the second vibration detecting means detects the external vibrations only.

The computing means processes signals provided by the first and second detecting means to cancel signal components due to the external vibrations thereby to obtain an unbalance signal reflecting the unbalance vibrations only. This construction allows unbalance measurement to be carried out without being affected by external vibrations, and removes the external vibrations synchronized with the rotation of the measured object. These are achieved without necessitating a filter for removing noise signals and an amplifier for compensating for signal attenuation caused by the filter.

According to one of the unbalance point positioning methods provided by the present invention, deceleration is effected continuously from high-rate rotation to stoppage. Thus the time required for positioning may be shortened without waiting in the constant low-rate rotation for completion of counting as in the prior art.

The present invention requires a single, gradient adjustment operation instead of the two adjustment operations required in the prior art of measured object decelerating time and for positioning the unbalance point at a selected position. Thus the adjustment operation is simple and may be carried out accurately, eliminating the possibility of adjustment error.

Further, since deceleration is effected continuously from high-rate rotation to stoppage, no slips will occur between the drive belt and measured object as encountered in the known method when stopping the measured object instantly, which has been the main cause of positioning errors.

The signal from the drive control means to the drive means is also time-controllable to stop the measured object at a selected position after rotation of the measured object through a predetermined angle. Thus, by adjusting the time taken from start of the deceleration to stoppage, the position for stopping the unbalance point of the measured object may be adjusted in a short time and without necessitating a preset counter. The present invention provides a simple and efficient unbalance point positioning apparatus at low cost, which is capable of positioning the unbalance point at a selected position.

Where the signal from the drive control means to the drive means is time-controlled on the basis of a selected function, speed control may be effected with a desired characteristic such as a deceleration characteristic giving priority to positioning precision or to shortening of the time taken for positioning. This feature enables the unbalance point positioning apparatus to handle various types of objects and to have various characteristics.

Where the signal from the drive control means to the drive means is time-controlled on the basis of the discharge characteristic of the capacitor, the unbalance point positioning apparatus has the advantage of being relatively simple in construction and inexpensive.

Further, the unbalance point positioning apparatus of the present invention does not require a signal to be generated for every unit angle of rotation such as pulses for a stepping motor or pulses from a rotary encoder, and does not require a preset counter. The unbalance point position apparatus, therefore, has a simple and inexpensive construction.

Since the apparatus includes a feedback control system of the drive control signal and the frequency-responsive voltage corresponding to the rotational of the measured object, accurate positioning may be effected without positioning errors due to the slips between the drive belt and the measured object.

The time control is effected on the signal from the drive control means to the drive means by utilizing the unbalance phase signal, to stop the measured object after lapse of a predetermined time. This aspect allows the unbalance point of the measured object to be stopped at a selected position by adjusting the time from start of deceleration to stoppage.

Since the frequency-responsive voltage is d.c. voltage, the reference signal may just be synchronized with the rotational frequency of the measured object. There is no need for a signal marking every unit angle of rotation. The number of pulses may be one or more for one rotation; there is no limit to the number of pulses. Thus no rotary encoder is required, which renders the unbalance point positioning apparatus inexpensive.

Since no stepping pulses or rotary encoder are required for a positioning operation, no adverse influence is imparted on plane separation of the unbalance measurement by the encoder belt and drive belt as experienced in the prior art. Further, since the measured object is decelerated continuously from high-rate rotation to stoppage, no slips will occur between the drive belt and measured object as encountered when instantly stopping the measured object rotating at a constant low rate, which has been the main cause of positioning errors. These features enable a high precision positioning operation.

A desired positioning operation may be effected through deceleration control relying only on time control, with the feedback circuit omitted from the apparatus. This feature realizes even a simpler and more inexpensive positioning apparatus.

The unbalance signal detecting device according to the present invention does not require a filter for removing noise signals or an amplifier for compensating for the attenuation due to the filter. This detecting device can also remove noise components due to external vibrations synchronized with the rotational frequency of the measured object, to effect unbalance measurement without influences of the external vibrations. Thus the detecting device according to the present invention, though simple and inexpensive, allows accurate unbalance measurement.

Other features and advantages of the present invention will be apparent from the following description.

DESCRIPTION OF THE PREFERRED EMBODIMENTS

The present invention will be described in detail hereinafter with reference to the drawings.

Figure 1:
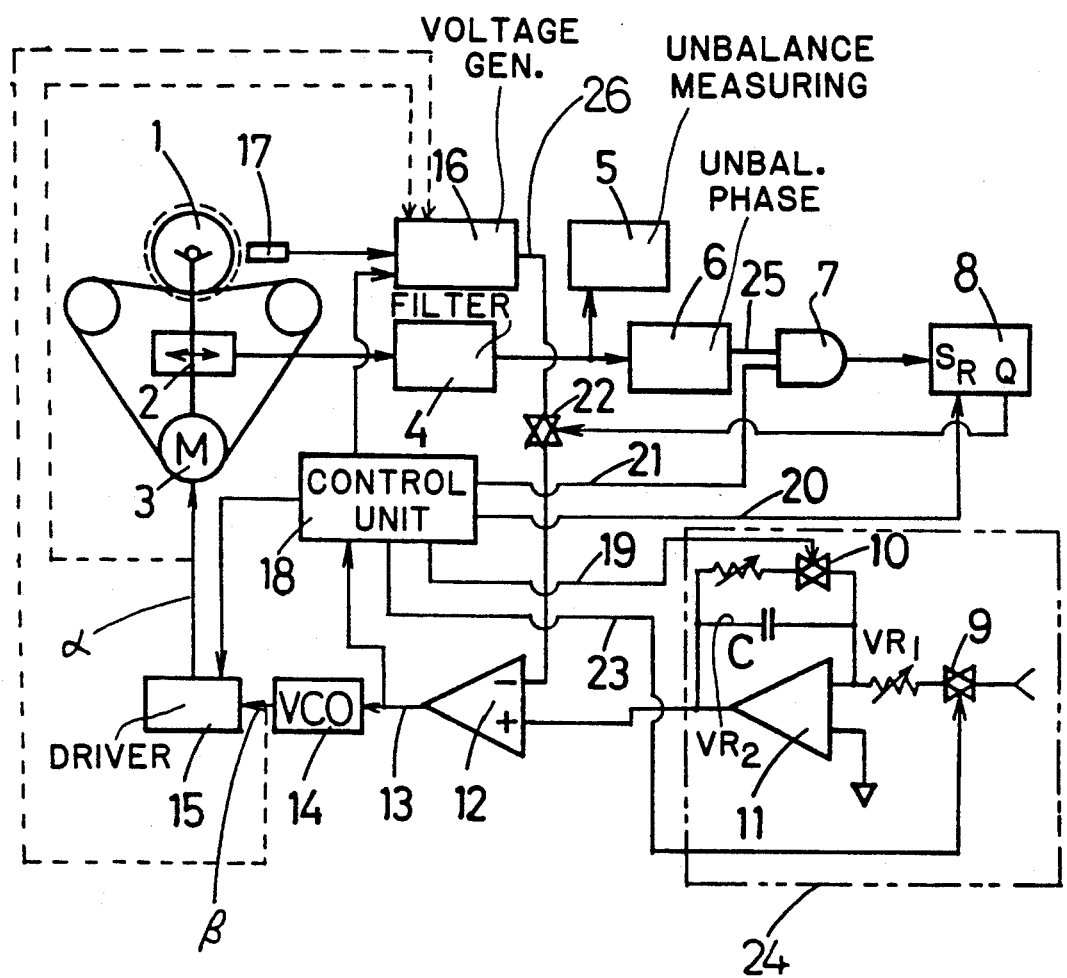
FIGS. 1, 3, and 9 are block diagrams of control circuits in unbalance point positioning apparatus for use in executing the unbalance point positioning methods according to the present invention, respectively.
Figure 2:
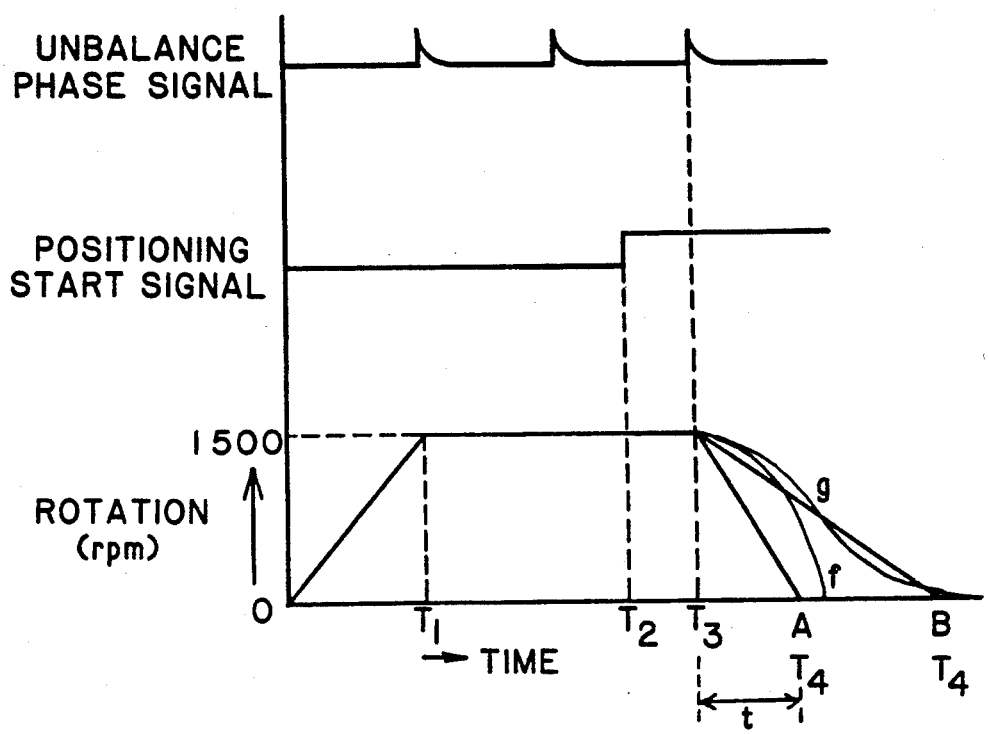
FIG. 2 is a graph showing operations of the control circuits and signal waveforms.
Figure 3:
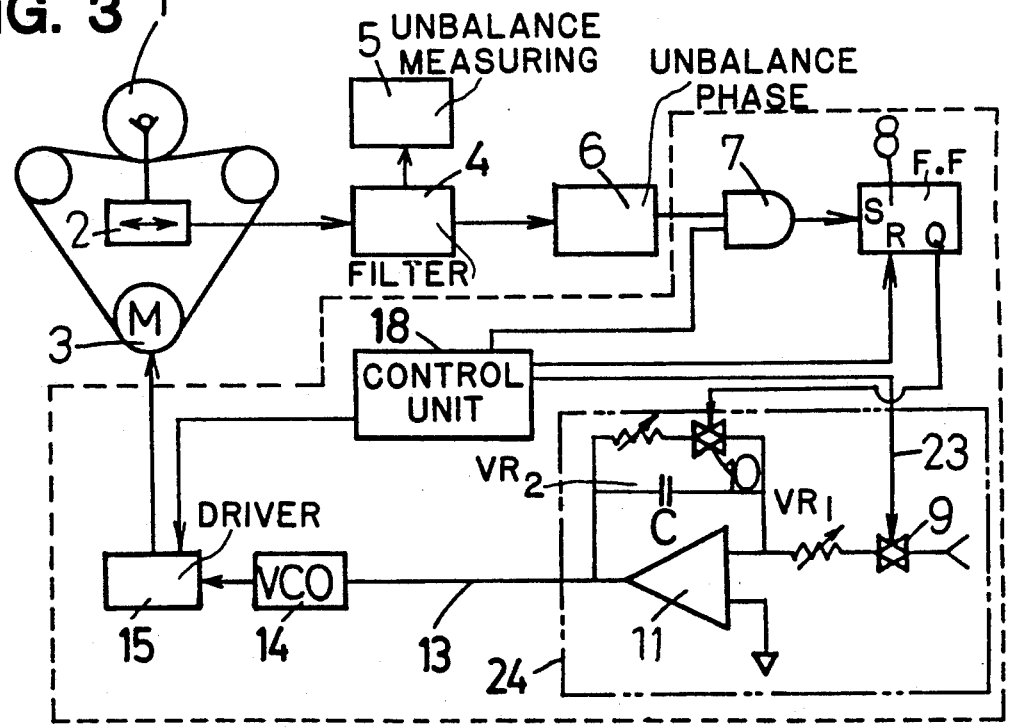

FIGS. 1 and 3 are block diagrams of control circuits of unbalance point positioning apparatus for use in executing the unbalance point positioning methods according to the present invention. FIG. 2 is a graph showing operation of the control circuits and signal waveforms.

As can be seen in the graph at the bottom of FIG. 2, the object being tested is started from a condition of zero rotation and is accelerated rather rapidly to a high speed and brought to a steady speed at which the unbalance measurements are to be made. In the example graphed the measurement rotation speed is 1500 rpm and is attained at time T1. The measurement speed is maintained long enough so that the amount of unbalance can be measured and the phase of that unbalance can also be determined. The unbalance phase signals are shown in the top part of FIG. 2. After the desired measurements of unbalance have been made, it is required to stop the rotation of the object and to do this precisely so that the rotation of the object stops with the unbalance point at a predetermined location. To achieve this precise stopping position, the unbalance phase signals shown in the top of FIG. 2 are used to trigger the start of the deceleration and then the deceleration is accomplished in a prescribed manner. In the middle of FIG. 2 the positioning start signal is shown to start at time T2. The first unbalance phase signal which occurs after T2 triggers the start of deceleration at T3. As can be seen from the graph at the bottom of FIG. 2, the rotating object is decelerated smoothly until it stops completely at time T4. Several different possible deceleration paths are shown in FIG. 2.

The embodiment shown in FIG. 3 is simpler than the one shown in FIG. 1 because in FIG. 3 the positioning operation is carried out by simply producing a gradually decreasing drive control signal and controlling the time between when deceleration begins and when rotation stops. The embodiment of FIG. 1 adds a feedback circuit to the system of FIG. 3. The feedback circuit plays a major role in FIG. 1 in stopping the rotation of the measured object at a precise position.

With reference to the embodiment of FIG. 1, a positioning operation from deceleration to stoppage will be described first, which operation is carried out referring to an unbalance phase signal produced during high speed measurement rotation.

In FIG. 1, a measured object 1 is rotated by a drive motor 3, and a vibration detector 2 transmits a vibration detection signal to a filter 4, thereby producing an unbalance signal. An amount of unbalance provided by the unbalance signal is stored in an unbalance measuring circuit 5. The unbalance signal is then input to an unbalance phase signal generator 6 to produce an unbalance phase signal 25. Thus, the vibration detector 2, filter 4 and unbalance phase signal generator 6 constitute an unbalance phase signal generating device. A gate circuit 7 receives the unbalance phase signal 25 and a positioning start signal 21 output from a control unit 18, and provides an output in response to these two signals. This output triggers a Q output of a flip-flop 8, which closes an analog switch 22 into "on" state. At this time, an analog switch 10 is closed into "on" state by a decelerate signal 19 from the control unit 18. A reset signal 19 from control unit 18 controls the opening and closing of analog switch 10 while a start signal 23 from control unit 18 controls the opening and closing of analog switch 9. When the analog switch 22 is closed, a rotational frequency sensor 17 detects characteristics of the outer periphery of measured object 1, and outputs a signal to a voltage generator 16 which outputs a frequency-responsive voltage 26 corresponding to a rotational frequency. The voltage 26 is input to a subtracter terminal of a subtracting element 12 for subtraction from a control voltage corresponding to a high speed measurement rotational frequency and output from a drive control signal generating device 24.

The drive control generating device 24 will be described more fully below with reference to an identical device in FIG. 3. Device 24 uses a capacitor C in conjunction with a charge resistor VR1 and a discharge resistor to selectively output a gradually increasing or gradually decreasing voltage. When switch 9 is closed and switch 10 is open, capacitor C is charged through charge resistor VR1 and the output voltage of device 24 increases with the charge on capacitor C. When switch 9 is opened and switch 10 is closed, capacitor C is discharged through the parallel discharge resistor and the output voltage decreases with the charge on capacitor C. During the positioning operation, switch 10 is closed so that the capacitor can gradually discharge.

In FIG. 1 the output from device 24 is one of the inputs to subtracting element 12. The other input is the feedback signal from voltage generator 16 which corresponds to the rotational frequency of measured object 1. The amount of feedback can be selected by adjusting the relationship between the output of voltage generator 16 and the speed of rotation of measured object 1. By adjusting the ratio between the generated voltage and the rotation speed, the period of deceleration can be lengthened or shortened.

The subtracting element 12 outputs a drive control signal 13 to a voltage-frequency converter 14. A pulse signal β output from the voltage-frequency converter 14 has a frequency decreasing with lowering of the frequency-responsive voltage 26 output from the voltage generator 16. The voltage-frequency converter 14 stops the signal emission when, in due time, the drive control signal 13 output from the subtracting element 12 falls to a negative voltage. Then a driver 15 stops the drive motor 3 which in turn stops the measured object 1.

The feedback of signal 26 prevents positioning error from being caused by slips occurring between the drive device and the measured object. During a positioning operation the drive control signal from device 24 gradually decreases and any slips between the measured object and the drive device will leave the measured object rotating faster than the drive device. In such a case, as the signal from device 24 becomes small, the feedback voltage on line 26 can exceed the voltage from device 24 and the output voltage from subtracting element 12 will be negative. This negative signal on line 13 will stop drive motor 3.

The deceleration path for the embodiment of FIG. 1 would be quite similar to the deceleration paths shown at the bottom of FIG. 2. The feedback circuit would continuously compensate for any incipient slippage and result in a smooth deceleration to stoppage.

Now that the description has covered the precise stopping of the rotating object, the rest of the operation will be described, i.e. starting rotation, attaining measurement speed, and making the unbalance measurement.

The control unit 18 outputs a start signal 23 and the reset signal 19 to start rotation of the measured object 1.

First, an analog switch 9 is closed to charge a feedback capacitor C of a Miller integrator circuit 11 with control voltage through a charge resistor VR1. Then the control voltage output from the drive control signal generating device 24 increases to and stabilizes at the voltage corresponding to the high-rate rotational frequency. The analog switch 22 remains open meanwhile, to effect no voltage application to the subtracter terminal of the subtracting element 12. Consequently, the drive control signal 13 output from the subtracting element 12 also increases to cause the voltage-frequency converter 14 and driver 15 to accelerate the drive motor 3. As a result, the rotation of measured object 1 reaches the high speed measurement frequency (T1), whereupon an unbalance measurement is started.

The unbalance measurement is made during the period from T1 to T2 in FIG. 2 while the object is rotating at a steady measurement speed. After this predetermined amount of time, the control unit 18 outputs the positioning start signal 21.

Thereafter an unbalance point positioning operation begins as described hereinbefore.

The rotational frequency sensor 17 may comprise an optical sensor, a magnetic sensor, or a rotary encoder rotatable with the measured object 1 through a belt wound thereon. It will serve the purpose if the detection is effected synchronously with the rotational frequency. For example, as shown in broken lines in FIG. 1, instead of providing a special sensor, the drive motor 3 may comprise a stepping motor controllable by drive pulses α, with the voltage-frequency converter 14 outputting the pulse signal β. Each pulse need not correspond to a unit angle of rotation. Further, there is no limitation to the number of pulses for one rotation; one or more pulses for each rotation allows generation of the frequency-responsive voltage.

Referring to FIGS. 1 and 2, when the control unit 18 outputs the start signal 23 and reset signal 19, the rotation of measured object 1 increases from 0 rpm to about 1,500 rpm (high-rate measurement rotational frequency). When the rotation reaches 1,500 rpm or thereabouts (T1), the unbalance measurement is started. The unbalance measurement is terminated by the positioning start signal 21 output from the control unit 18 (T2), and the rotation is decelerated in timed relationship with the unbalance phase signal (T3).

Deceleration control may be effected to stop the rotation of measured object 1 at a point of time T4 which is a selected time (t seconds) from the point of time T3. In other words, a gradient of deceleration may be selected to stop an unbalance point at a selected position (A or B, for example). This gradient may be selected such as by adjusting the voltage of rotational frequency-responsive voltage generator 16 corresponding to one rotation. For example, the time taken from start of deceleration to stoppage is halved by doubling the voltage produced in response to one rotation of measured object 1. Thus, by slowing down the rotation with a sharper gradient, the unbalance point may be stopped at a varied position.

Further, a microcomputer may be used to output the drive control signal 13 or the pulse signal β and to monitor the lowering of the rotational frequency of measured object 1. In this case, the drive control signal 13 is corrected when the deceleration characteristic of the rotational frequency deviates from a predetermined characteristic.

Thus the unbalance point may be stopped at a selected position by appropriately setting the gradient of deceleration.

The above control circuit has the advantage of determining a stopping position with high precision by decelerating the rotation under feedback control by means of the frequency-responsive voltage signal. It is also possible to delete the feedback circuit and yet realize a desired positioning operation through deceleration under a simple time control only. This aspect will particularly be described with reference to FIGS. 2 and 3.

In FIG. 3, a measured object 1 is rotated by a drive motor 3, and a vibration detector 2 transmits a detection signal to a filter 4, thereby producing an unbalance signal. An amount of unbalance provided by the unbalance signal is measured by and stored in an unbalance measuring circuit 5. The unbalance signal is then input to an unbalance phase signal generator 6 to produce an unbalance phase signal 25. Thus, the vibration detector 2, filter 4 and unbalance phase signal generator 6 constitute an unbalance phase signal generating device. A gate circuit 7 receives the unbalance phase signal 25 and a positioning start signal 21 output from a control unit 18, and provides an output in response to these two signals (T3). This output triggers a Q output of a flip-flop 8, which closes an analog switch 10 of a drive control signal generating device 24. At this time, an analog switch 9 is opened by a signal from the control unit 18, and an electric charge of a charge capacitor C is discharged through a discharge resistor VR2. Then a drive control signal 13 output from the drive control signal generating device 24 lowers, with which lowers emission frequency of a voltage-frequency converter 14. The charge capacitor C acts as a CR timer utilizing Miller integration in the drive control signal generating device 24, and discharges its electric charge for a predetermined time t. After lapse of the predetermined time t, the drive control signal 13 becomes a stopping voltage to stop the signal emission from the voltage-frequency converter 14. Then the drive motor 3 stops under control by a driver 15, which in turn stops the measured object 1.

Thus an unbalance point of the measured object 1 may be stopped at a selected position by setting the discharge resistor VR2 to an appropriate value to determine the time t.

Thereafter, a measuring operation begins as follows.

The control unit 18 outputs a reset signal 20 to the flip-flop 8 and a start signal 23 to the analog switch 9, thereby to start rotation of the measured object 1. At this time, charging of the charge capacitor C of Miller integrator circuit 11 begins with a current adjusted by a charge resistor VR1. Then the drive control signal 13 output from the drive control signal generating device 24 begins to increase, and emission frequency of the voltage-frequency converter 14 increases in proportion to the drive control signal 13. This causes the driver 15 and drive motor 3 to start rotating the measured object 1. Unbalance measurement is started when the rotation of measured object 1 reaches the high-rate measurement frequency (T1).

The rate of increase in the rotational frequency is adjustable by adjusting the charge resistor VR1.

Referring to FIG. 2, the rotation of measured object 1 increases from 0 rpm to about 1,500 rpm (high-rate measurement rotational frequency). When the rotation reaches 1,500 rpm or thereabouts (T1), the unbalance measurement is started. The unbalance measurement is terminated by the positioning start signal 21 output from the control 18 to the gate circuit 7 (T2), and the rotation is decelerated in timed relationship with the unbalance phase signal (T3).

The rotation may be stopped at any desired time such as by adjusting the discharge resistor VR2 of the charge capacitor C to select a gradient of deceleration of the measured object 1. Consequently, an unbalance point of the measured object may be stopped at a selected position.

Further, the deceleration may be effected with a desired characteristic by causing the drive control signal 13 to be generated on the basis of a selected function generated by a function generating circuit such as a microcomputer. As shown in a curve f in FIG. 2, for example, the rotation may be decelerated at a fixed negative acceleration rate to effect position setting in a minimum time with the least possibility of slippage.

The drive motor 3 may comprise a stepping motor which receives a pulse signal with gradually decreasing or increasing pulsewidths as programmed in the microcomputer.

In this way, the positioning operation may be carried out through deceleration with optimal characteristics.

The foregoing circuit may further include a device for setting or detecting types of the measured object 1. This device will allow appropriate deceleration characteristics to be selected according to the type of the measured object 1. In this way, a very flexible unbalance point positioning apparatus may be provided which is capable of positioning each measured object 1 through deceleration with an optimal characteristic even where various types of objects are set in random order, and which, therefore, is suited also to a positioning operation for small numbers and many different types of objects.

This unbalance point positioning apparatus has varied characteristics available for positioning the unbalance point. Such characteristics include a deceleration characteristic giving priority to positioning precision (as shown in a curve g in FIG. 2) and one giving priority to shortening of the time necessary for positioning (as shown in the curve f in FIG. 2).

Further, a microcomputer may be used to output the drive control signal 13 and monitor the lowering of the rotational frequency of measured object 1. In this case, the drive control signal 13 is corrected when the deceleration characteristic of the rotational frequency deviates from a selected characteristic.

The drive control signal 13 may be generated from a function generating circuit provided by a digital logic element. This construction enables proper and flexible deceleration/positioning by means of a semiconductor memory or the like.

Figure 9:
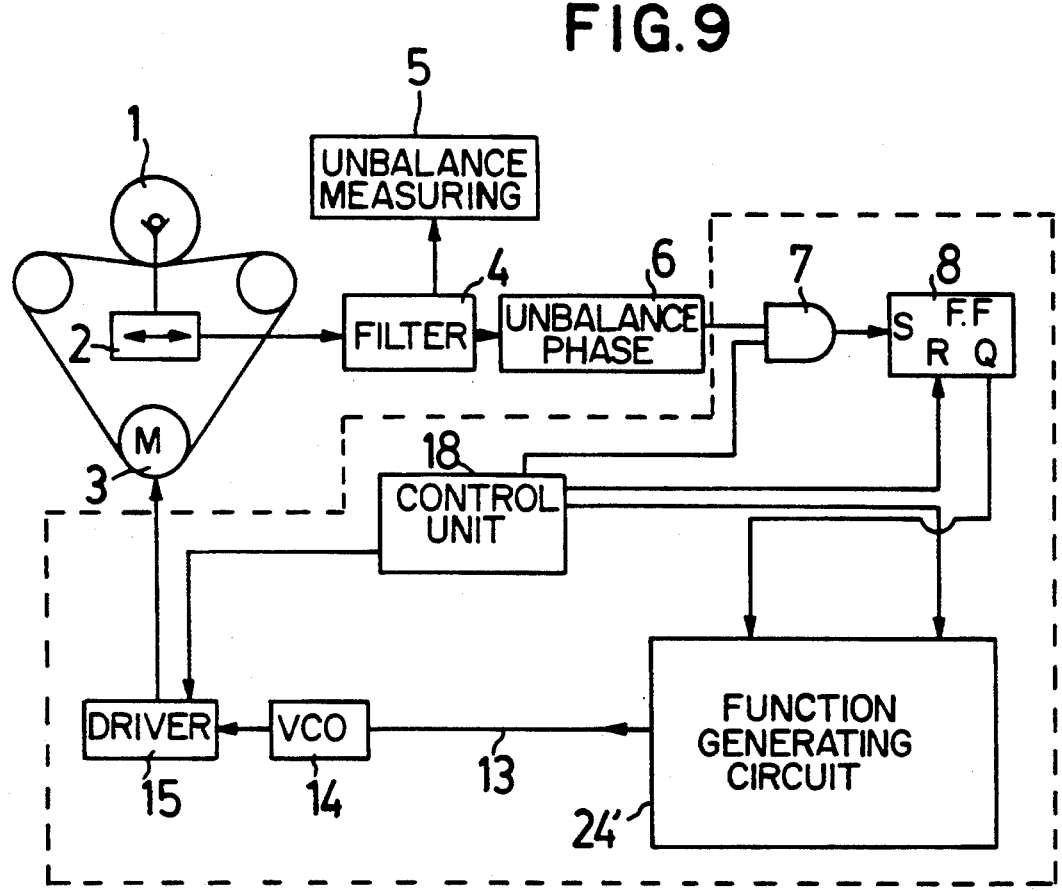

FIG. 9 shows a block diagram of control circuits in unbalance point positioning apparatus similar to FIG. 3. In FIG. 9, the specific drive control generating device 24 of FIG. 3 has been replaced by a generic function generating circuit 24'. The embodiment of FIG. 9 operates just as that of FIG. 3 except that the generated function is not limited to the characteristics of a resistor-capacitor circuit.

An unbalance signal detecting device and a measured object support mechanism according to the present invention will be described in detail hereinafter with reference to the drawings.

Figure 4:
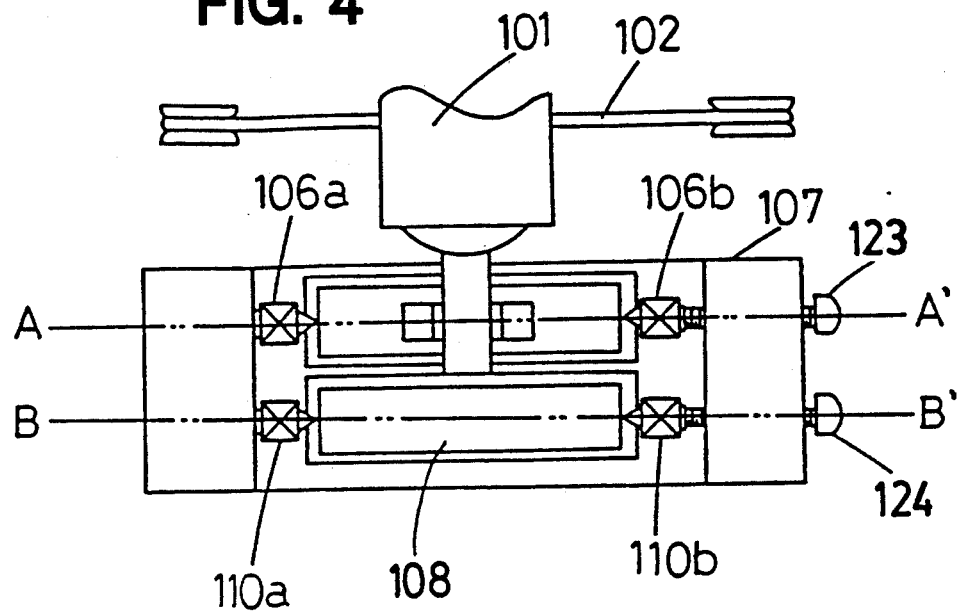
FIG. 4 is a plan view of an unbalance signal detecting device used in an unbalance measuring apparatus.
Figure 5:
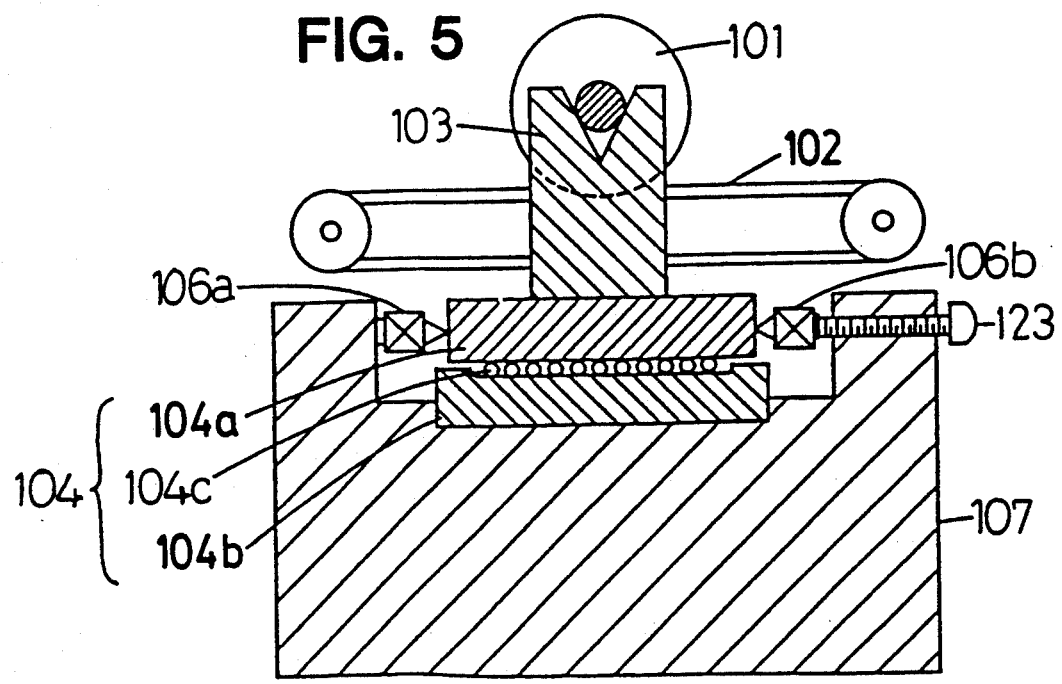
FIG. 5 is a section taken on line A—A' of FIG. 4.
Figure 6:
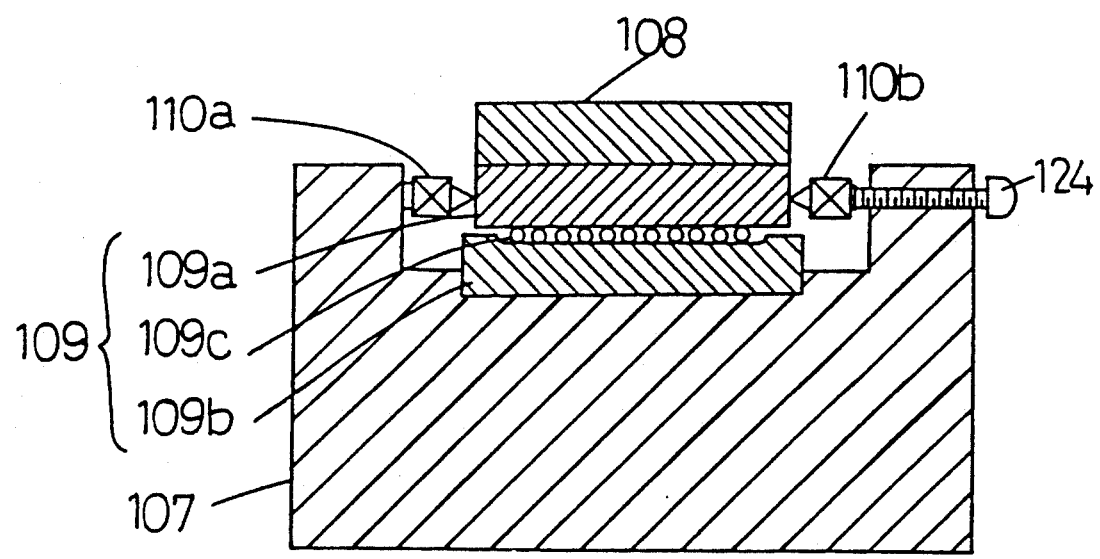
FIG. 6 is a section taken on line B—B' of FIG. 4.
Figure 7:
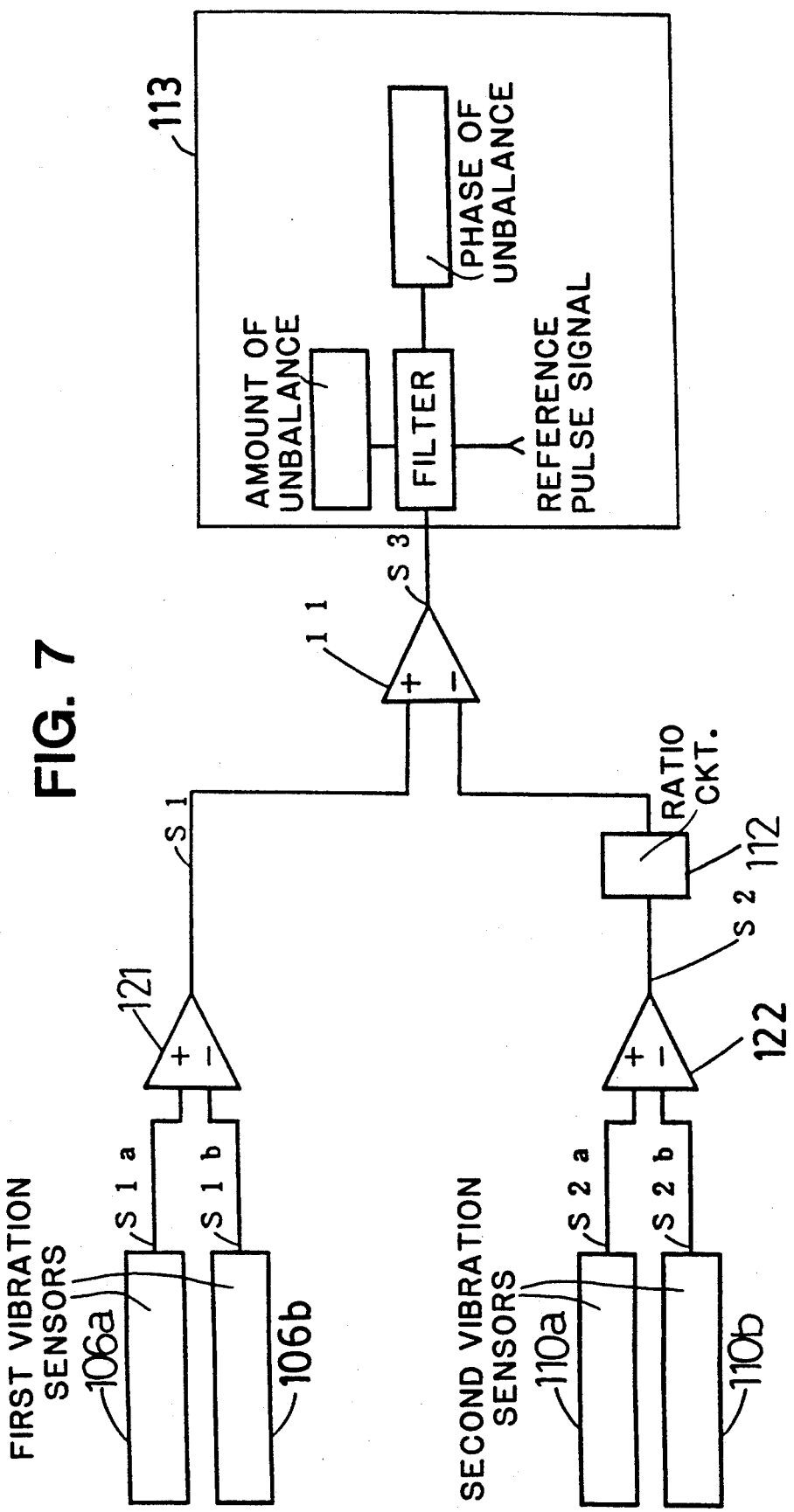
FIG. 7 is a block diagram of a principal portion of the unbalance signal detecting device.
Figure 8:
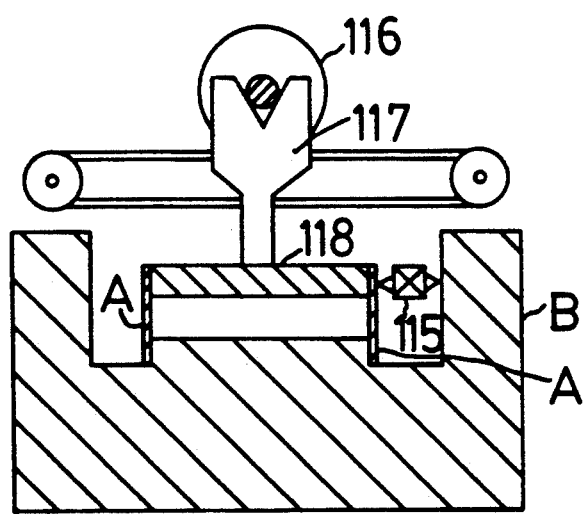
FIG. 8 is a sectional view of a principal portion of an unbalance signal detecting device known in the art.

FIG. 4 is a plan view of an unbalance signal detecting device used in the unbalance measuring apparatus. FIG. 5 is a section taken on line A—A' of FIG. 4. FIG. 6 is a section taken on line B—B' of FIG. 4. FIG. 7 is a block diagram of a principal portion of the unbalance signal detecting device.

Referring to FIGS. 4 and 5, the measured object comprises a rotor 101 of an electric motor rotatable by a drive belt 102. The rotor 101 is supported by a bearing 103 which transmits horizontal vibrations produced by the rotor 101 in high-rate rotation to first vibration sensors 106a and 106b through a movable plate 104a of a supporting device 104.

High sensitivity is achieved by differentiating the two first vibration sensors 106a and 106b.

Number 107 indicates a base block securely supporting a stationary plate 104 of the supporting device 104 and proximal ends of the first vibration sensors 106a and 106b.

The first vibration sensors 106a and 106b detect composite vibrations consisting of vibrations due to the unbalance of the measured object 101 and vibrations of the base block 107 due to external vibrations.

The supporting device 104 further includes a plurality of bearings 104c arranged between a bottom surface of the movable plate 104a and a top surface of the stationary plate 104b, to reduce sliding friction.

Referring to FIGS. 4 and 6, number 108 indicates a dummy load having approximately the same weight as the rotor 101. As is the movable plate 104a, the dummy load 108 is supported by a supporting device 109.

Numbers 110a and 110b indicate second vibration sensors each sandwich between the dummy load 108 standing still by inertia and the base block 107 which vibrates with external vibrations. The second vibration sensors 110a and 110b are operable to detect the external vibrations.

High sensitivity is achieved by differentiating the two second vibration sensors 110a and 110b.

Adjustable bolts 123 and 124 are provided to hold the first vibration sensors 106a and 106b and the second vibration sensors 110a and 110b against downward slipping, respectively.

Referring to FIG. 7, the first vibration sensors 106a and 106b output composite signals S1a and S1b including a signal resulting from the rotation of an unbalance point of the rotor 101 and a noise signal due to the external vibrations, respectively.

On the other hand, the second vibration sensors 110a and 110b output signals S2a and S2b each consisting only of a noise signal due to the external vibrations.

The signals S1a and S1b are subjected to differential amplification at a differential amplifier 121 to produce a composite signal S1. The signals S2a and S2b are subjected to differential amplification at a differential amplifier 122 to produce a noise signal S2. The composite signal S1 and noise signal S2 are input to a substracted circuit 111 where the noise signal S2 is substracted from the composite signal S1, thereby to produce an unbalance signal S3. Prior to input to the substracted circuit 111, the noise signal S2 passes through a ratio circuit 112 where the noise signal S2 is multiplied by a predetermined constant. At the same time, amplitude and phase adjustments are effected such that noise components of the composite signal S1 and noise signal S2 cancel each other. As a result, the unbalance signal S3 produced from the substracter circuit 111 comprises a signal indicative of the vibration due to the unbalance point only.

The unbalance signal S3 is input to an unbalance measuring circuit 113 which derives an amount of unbalance from a vibration component of the unbalance signal S3, and a phase of the unbalance point from a phase component of the unbalance signal S3 and the phase of a reference pulse signal.

Thus the unbalance signal detecting device accurately obtains the amount and phase of unbalance of the rotor or measured object 101.

To remove the noise signal from the unbalance signal S3, the ratio circuit 112 is adjusted such that the unbalance signal S3 is at a minimum level when the rotor 101 stands still. Then, when the rotor 101 is rotated at high speed by the drive belt 102, the noise signal contained in the unbalance signal S3 is minimized.

The noise signal may be removed from the unbalance signal S3 by determining a substracting ratio between the signal S1 and signal S2 through calculation and comparison between inertial mass and moment of inertia of the rotor 101, bearing 103 and movable plate 104 in FIGS. 4 and 5 and those of the dummy load 108.

As described above, for detecting horizontal vibrations of the rotor 101 and dummy load 108, the supporting devices 104 and 109 support vertical loads in a manner to reduce resistance to the horizontal vibrations and allow free movements. Consequently, a slight kinetic energy acting horizontally is not readily absorbed, which allows the vibrations to be detected with high precision.

What is claimed is:

1. An unbalance point positioning method for use in measuring a rotatable object, comprising the steps of:
producing a drive control signal forming the basis for acceleration, constant-rate rotation and deceleration of a measured object, obtaining an unbalance phase signal resulting from revolution of an unbalance point of the measured object by causing a drive device controlled by said drive control signal to rotate the measured object at a high rate, producing a frequency-responsive voltage corresponding to a rotational frequency of the measured object, starting said deceleration control through said drive control signal, by utilizing said unbalance phase signal as a trigger, while effecting feedback control of the rotational frequency of the measured object with said frequency-responsive voltage, and continuing said deceleration control through said control signal, while continuing feedback control of the rotational frequency of the measured object with said frequency-responsive voltage to smoothly and completely stop the measured object with the unbalance point of the measured object at a selected position after rotation of the measured object through a predetermined angle.

2. An unbalance point positioning apparatus for use in measuring a rotatable object, comprising:

drive control signal generating means for producing a drive control signal forming a basis for acceleration, constant-rate rotation, deceleration, and complete smooth stoppage of a measured object after said measured object has rotated through a predetermined angle from the start of said deceleration to said complete stoppage so that the unbalance point of the measured object stops at a selected position, drive means controllable by said drive control signal to rotate said measured object at a high rate, unbalance phase signal generating means for producing an unbalance phase signal resulting from revolution of an unbalance point of the measured object, frequency-responsive voltage generating means for producing a frequency-responsive voltage corresponding to a rotational frequency of the measured object, a feedback circuit for effecting feedback control of the rotational frequency of the measured object with said frequency-responsive voltage during said deceleration of said measured object, and a gate circuit for starting deceleration control of the measured object with said drive control signal in timed relationship with said unbalance phase signal, whereby the measured object is stopped after rotation through a predetermined angle to stop the unbalance point of the measured object at a selected position.

3. An unbalance point positioning apparatus as claimed in claim 2, wherein said drive control signal generating means for producing a drive control signal includes a function generating circuit to generate said control signal which decreases with a desired characteristic.

4. An unbalance point positioning apparatus for use in measuring a rotatable object, comprising:

drive control signal generating means for producing a drive control signal forming a basis for acceleration, constant-rate rotation and deceleration of a measured object, wherein said drive control means for producing a drive control signal includes a Miller integrator circuit having a capacitor and either a fixed resistor or a variable resistor to generate said drive control signal which first increases and then stabilizes, drive means controllable by said drive control signal to rotate said measured object at a high rate, unbalance phase signal generating means for producing an unbalance phase signal resulting from revolution of an unbalance point of the measured object, frequency-responsive voltage generating means for producing a frequency-responsive voltage corresponding to a rotational frequency of the measured object, a feedback circuit for effecting feedback control of the rotational frequency of the measured object with said frequency-responsive voltage during said deceleration of said measured object, and a gate circuit for starting deceleration control of the measured object with said drive control signal in timed relationship with said unbalance phase signal, whereby the measured object is stopped after rotation through a predetermined angle to stop the unbalance point of the measured object at a selected position.

5. An unbalance point positioning apparatus for use in measuring a rotatable object, comprising:

drive control signal generating means for generating a drive control signal which forms a basis for high speed rotation of a measured object and for a predetermined smooth continuous deceleration of said measured object from said high speed to a smooth complete stop, wherein said drive control means includes a capacitor and resistor circuit to generate said predetermined smooth continuous deceleration down to said smooth complete stop by causing said capacitor to discharge through said resistor and wherein the rate of said deceleration during the entire deceleration from start of deceleration down to complete resting of the measured object at a selected angular position relative to the start of deceleration is continuously determined at least in part by the rate of discharge of said capacitor, drive means controllable by said drive control signal to rotate said measured object at a high rate, unbalance phase signal generating means for producing an unbalance phase signal resulting from revolution of an unbalance point of the measured object, and a gate circuit for starting deceleration control of said measured object with said drive control signal in timed relationship with said unbalance phase signal, whereby a predetermined control is effected on the drive means by the drive control signal from the start of the deceleration to the instant of no motion by the measured object, so that the unbalance point of the measured object is stopped at said selected angular position.

6. An unbalance point positioning apparatus as claimed in claim 5, which includes:

frequency-responsive signal generating means for producing a frequency-responsive signal corresponding to the rotational frequency of the measured object, and a feedback control circuit for effecting feedback control of the rotational frequency of the measured object by feeding back said frequency-responsive signal during said deceleration of said measured object to combine with said drive control signal to further control said drive means during said deceleration to effect the deceleration of said measured object.

7. An unbalance point positioning apparatus as claimed in claim 6, wherein said drive control signal and said feedback frequency-responsive signal cooperate to gradually and smoothly completely stop the measured object after rotation through a predetermined angle to stop the unbalance point of the measured object at said selected angular position.

8. An unbalance point positioning apparatus as claimed in claim 7, wherein said drive control signal and said fedback frequency-responsive signal are combined in a subtractor circuit.

9. An unbalance point positioning apparatus as claimed in claim 6, wherein said frequency-responsive signal generating means includes an optical sensor to sense the rotation of the measured object.

10. An unbalance point positioning apparatus as claimed in claim 6, wherein said frequency-responsive signal generating means includes a magnetic sensor to sense the rotation of the measured object.

11. An unbalance point positioning apparatus as claimed in claim 6, wherein said frequency-responsive signal generating means includes a rotary encoder rotatable with the measured object through a belt wound on the object.

12. An unbalance point positioning method for use in measuring a rotatable object, comprising the steps of:
producing a drive control signal which forms the basis for controlling the rotation of the measured object in acceleration, constant-rate rotation and deceleration down to a complete smooth stop,
driving said rotatable object in rotation under the control of said drive control signal,
obtaining an unbalance phase signal resulting from the revolution of an unbalance point of the measured object during said constant-rate rotation of the measured object,
starting said deceleration of said measured object under the control of said drive control signal by utilizing said unbalance phase signal as a trigger to start said deceleration,
producing a rotation signal corresponding to the rotational speed of said measured object,
feeding back said rotational signal to said drive control signal so that during deceleration said drive control signal includes feedback, and
allowing said drive control signal, including said feedback, during said deceleration to gradually and smoothly slow down said measured object and gradually and smoothly stop said measured object after rotation during said deceleration through precisely a predetermined angle.

13. An unbalance point positioning apparatus for use in measuring a rotatable object, comprising:
drive means for rotating said rotatable object,
feedback means for producing a feedback signal corresponding to the rotation speed of said rotatable object,
means for producing a drive control signal, said means including a drive control signal generating device and means to combine the output of said drive control signal generating device and said feedback signal, and wherein said drive control signal producing means controls said drive means to rotate said rotatable object during a period of acceleration of the rotatable object, then a period of constant rate rotation, and then a period of continuous smooth deceleration during which the produced drive control signal causes the drive means to slow down the rotatable object smoothly, gradually and continuously to bring said object to a smooth complete stop at a desired precise angular position,
unbalance phase signal generating means for producing an unbalance phase signal resulting from revolution of an unbalance point of the measured object, and
means to start said period of deceleration in timed relationship with said unbalance phase signal, whereby the measured object is stopped after rotation through a predetermined angle to stop the unbalance point of the measured object at said desired angular position.

* * * * *